(12) United States Patent
Mekid

(10) Patent No.: US 8,330,058 B2
(45) Date of Patent: Dec. 11, 2012

(54) PORTABLE AIRBAG SCALE

(75) Inventor: Samir Mekid, Manchester (GB)

(73) Assignee: King Fahd University of Petroleum and Minerals, Dhahran (SA)

(*) Notice: Subject to any disclaimer, the term of this patent is extended or adjusted under 35 U.S.C. 154(b) by 306 days.

(21) Appl. No.: 12/662,889

(22) Filed: May 10, 2010

(65) Prior Publication Data

US 2011/0272197 A1 Nov. 10, 2011

(51) Int. Cl.
G01G 21/28 (2006.01)
G01G 5/04 (2006.01)
G01G 5/06 (2006.01)

(52) U.S. Cl. .................. 177/126; 177/127; 177/208

(58) Field of Classification Search .................. 177/208, 177/209, 254, 126, 127
See application file for complete search history.

(56) References Cited

U.S. PATENT DOCUMENTS

| | | | |
|---|---|---|---|
| 2,954,221 A | 9/1960 | Ernst | |
| 2,998,089 A | 8/1961 | Ernst | |
| 3,123,165 A | 3/1964 | Carson, Jr. et al. | |
| 3,371,732 A | 3/1968 | Stein | |
| 4,002,216 A | 1/1977 | Solow | |
| 4,085,810 A | 4/1978 | Wellman | |
| 4,306,629 A | 12/1981 | Powell | |
| 4,431,072 A * | 2/1984 | Stepp | 177/209 |
| 4,542,547 A | 9/1985 | Sato | |
| 4,782,905 A | 11/1988 | Lam | |
| 4,957,286 A * | 9/1990 | Persons et al. | 482/57 |
| 5,092,415 A * | 3/1992 | Asano | 177/208 |
| 5,129,472 A | 7/1992 | Du et al. | |
| 5,234,065 A * | 8/1993 | Schmidt | 177/209 |
| 5,606,516 A | 2/1997 | Douglas et al. | |
| 5,987,370 A | 11/1999 | Murphy et al. | |
| 6,076,853 A | 6/2000 | Stanley | |
| 6,094,762 A * | 8/2000 | Viard et al. | 5/713 |
| 6,504,113 B2 | 1/2003 | Gallard et al. | |
| 7,459,645 B2 * | 12/2008 | Skinner et al. | 177/144 |
| 7,521,638 B1 | 4/2009 | Godshaw et al. | |
| 7,842,892 B2 * | 11/2010 | Wang | 177/144 |
| 2002/0134592 A1 | 9/2002 | Gray et al. | |
| 2005/0082094 A1 | 4/2005 | Gebert | |
| 2009/0084609 A1 * | 4/2009 | Skinner et al. | 177/144 |
| 2010/0300768 A1 * | 12/2010 | Reiter | 177/45 |

FOREIGN PATENT DOCUMENTS

DE 3834497 A1 * 4/1990
GB 1176826 A 1/1970

* cited by examiner

Primary Examiner — Randy W Gibson
(74) Attorney, Agent, or Firm — Richard C. Litman

(57) ABSTRACT

The portable airbag scale is a scale that measures the weight of a load based upon a difference between measured air pressure in an inflatable bladder, the difference being measured between a first state, where the load is not positioned on the inflatable bladder, and a second state, in which the load is supported on the inflatable bladder. The portable airbag scale includes an inflatable bladder having opposed upper and lower walls and at least one sidewall. A port is formed through the at least one sidewall for selective inflation and deflation of the inflatable bladder. A pressure sensor is mounted within the inflatable bladder for measuring the air pressure therein. A controller selectively calculates the weight of the load based upon the measured difference in air pressure. A display is provided for displaying the weight of the load.

18 Claims, 3 Drawing Sheets

PORTABLE AIRBAG SCALE

BACKGROUND OF THE INVENTION

1. Field of the Invention

The present invention relates to devices for measuring the weight of an object, and particularly to a portable airbag scale that calculates the weight of an object based on changes in air pressure measurements.

2. Description of the Related Art

Typical weight scales utilize a variety of complex mechanical elements that must remain in balance and alignment in order to provide accurate measurements. For very fine measurements, such as laboratory-scale measurements, the scales typically cannot be moved easily, as even a small mechanical shock will cause imbalance and misalignment of the weighing mechanisms. For large-scale measurements, such as scales utilized to weigh luggage, the scales are typically large enough that transportation thereof is relatively difficult.

Medium-sized scales, such as typical bathroom scales for measuring the weight of a human being, are readily transportable, but are not particularly accurate. It would be desirable to provide a high-accuracy scale that can also be easily transported without the act of transportation causing imbalances and misalignments leading to inaccuracies in measurement.

Thus, a portable airbag scale solving the aforementioned problems is desired.

SUMMARY OF THE INVENTION

The portable airbag scale is a scale that measures the weight of a load based upon a difference between measured air pressure within an inflatable bladder. The difference is measured between a first state, where the load is not positioned on the inflatable bladder, and a second state, in which the load is supported on the inflatable bladder.

The portable airbag scale includes an inflatable bladder having opposed upper and lower walls and at least one sidewall. The lower wall thereof is adapted for positioning on a support surface, such as the floor, and the upper wall is adapted for receiving the load to be weighed. A port is formed through the at least one sidewall for selective inflation and deflation of the inflatable bladder.

A pressure sensor is mounted within the inflatable bladder for measuring the air pressure therein. A controller selectively calculates the weight of the load based upon the difference between air pressure in the inflatable bladder measured when the load is not supported on the upper wall, and air pressure in the inflatable bladder measured when the load is supported on the upper wall. A display is provided for displaying the weight of the load.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
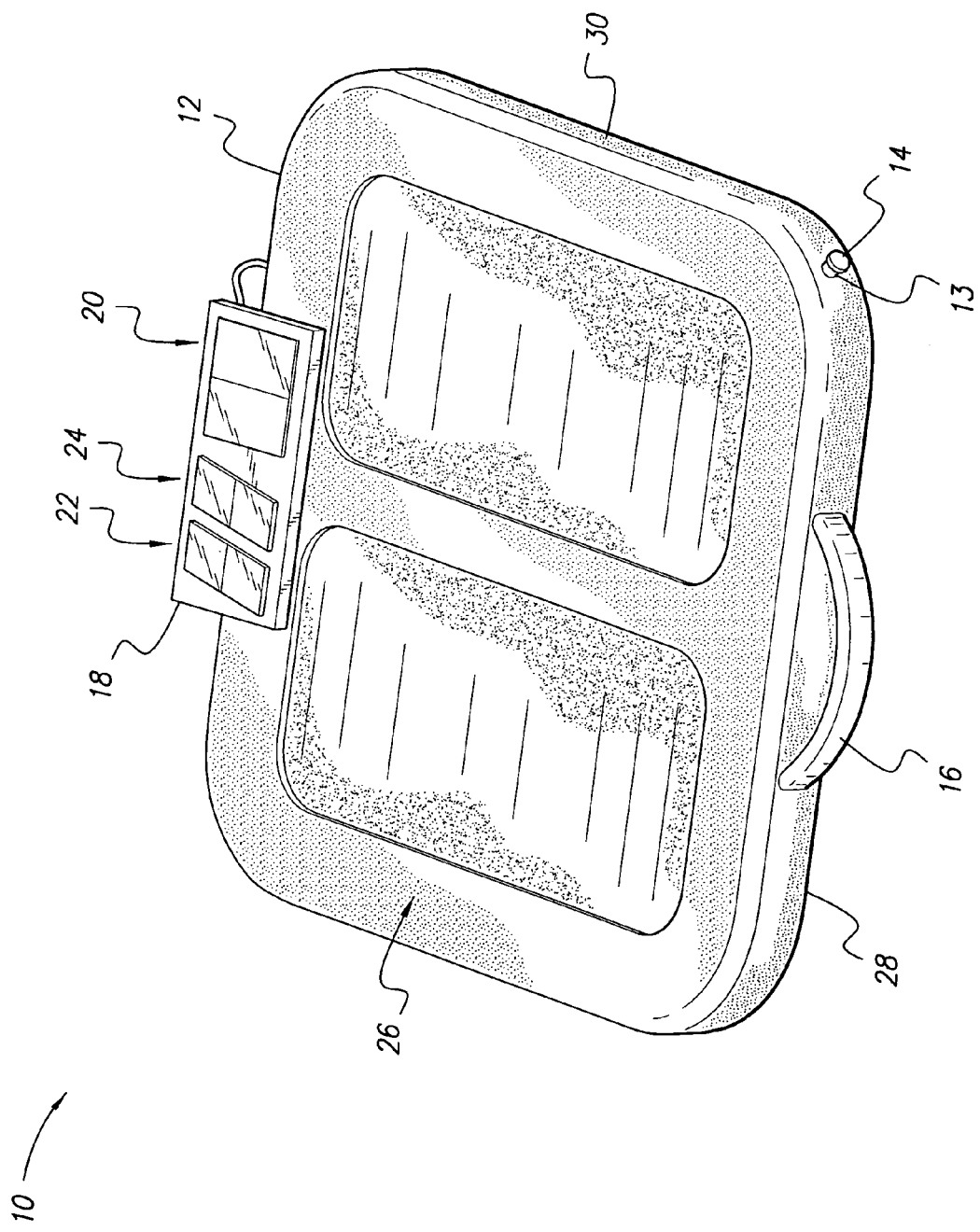
FIG. 1 is a perspective view of a portable airbag scale according to the present invention, shown expanded and inflated for use.

The portable airbag scale 10 is a scale that measures the weight of a load based upon a measured difference in air pressure. As best shown in FIG. 1, the portable airbag scale 10 includes an inflatable bladder 12 having opposed upper and lower walls 26, 28, respectively, and at least one sidewall 30. The lower wall 26 is adapted for positioning on a support surface, such as the floor, and the upper wall 26 is adapted for receiving the load to be weighed. A port 13 is formed through the at least one sidewall 30 for selective inflation and deflation of the inflatable bladder 12. The port 13 may simply be a tube selectively closed by a removable cap 14, or the port may include an air valve that permits selective one-way inflation or selective deflation of the inflatable bladder 12.

Any suitable source of air may be used to inflate the inflatable bladder 12, such as a separate air pump, the user's mouth, or the like. The inflatable bladder 12 may be formed from any suitable type of material capable of supporting such loads as a human being, an article of luggage, or the like without popping or tearing, the material being flexible and durable. The inflatable bladder 12 may be constructed in a manner similar to a conventional airbag.

Figure 3:
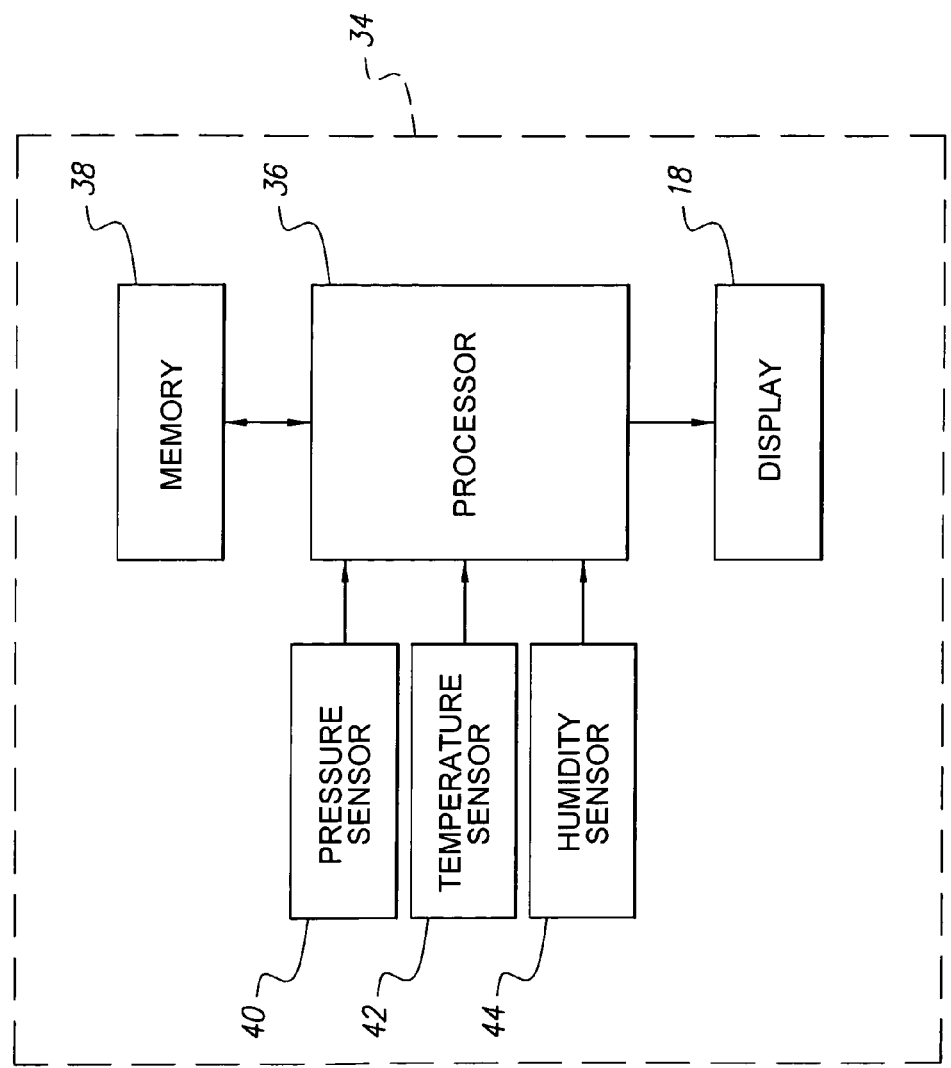
FIG. 3 is a block diagram of a controller of the portable airbag scale according to the present invention.

A pressure sensor 40 is mounted within the inflatable bladder 12 for measuring the air pressure therein. A controller 34 (diagrammatically illustrated in FIG. 3) selectively calculates the weight of the load based upon the difference between air pressure in the inflatable bladder 12 measured when the load is not supported on the upper wall 26, and air pressure in the inflatable bladder 12 measured when the load is supported on the upper wall 26.

Pressure sensor 40 is preferably a microelectromechanical system sensor (MEMS), although it should be understood that any suitable type of pressure sensor may be utilized. One such barometric amplified pressure sensor is manufactured as part number BARO-A-4V-MINI-MIL by the All Sensors Corporation of Morgan Hill, Calif. This pressure sensor has an output that is ratiometric to the supply voltage and operates between approximately 4.5 and 5.5 V DC. Operating pressures are between approximately 600 and 1,100 mbar.

Based upon the known inflated volume of the inflatable bladder 12 (and the known interior surface area), a processor 36 can calculate the weight of the load based upon the difference in measured air pressure. The pressure sensor 40 first measures the air pressure within the inflated bladder 12, without the load placed on upper wall 26, and this first measurement is stored in memory 38. At this point, an audible tone, such as a beep, is generated to inform the user that the value is stored in memory 38 and that the system is ready for weighing. Once the load has been placed on upper wall 26, the pressure sensor 40 takes a second air pressure measurement, which may also be stored in memory 38, and the processor 36 calculates the difference therebetween and subsequently calculates the weight of the load based upon this difference.

The weight of the load, which may be displayed selectively in pounds or kilograms, is displayed on display 18, which may be a liquid crystal display (LCD) or the like. The display 18 may be attached to the exterior surface of the inflatable bladder 12, as shown in FIG. 1, or may be positioned remotely therefrom. The memory 38 may be any suitable type of computer readable and programmable memory. Calculations are performed by the processor 36, which may be any suitable type of computer processor, or simply a circuit similar to those used in handheld calculators, and may be displayed to the user on display 18, which may be any suitable type of display.

The processor 36 may be associated with, or incorporated into, any suitable type of computing device, for example, a personal computer or a programmable logic controller. The display 18, the processor 36, the memory 38, and any associated computer readable recording media are in communication with one another by any suitable type of data bus, as is well known in the art. Examples of computer-readable recording media include a magnetic recording apparatus, an optical disk, a magneto-optical disk, and/or a semiconductor memory (for example, RAM, ROM, etc.).

Additionally, a temperature sensor 42 and a humidity sensor 44 may be further provided for respectively measuring the ambient temperature and humidity. Preferably, the display 18 is divided into three separate display regions, as illustrated in FIG. 1, with region 20 displaying the weight of the load, region 22 displaying the ambient temperature, and region 24 displaying the ambient humidity. Preferably, the temperature sensor 42 and the humidity sensor 44 are also microelectromechanical system sensors.

Figure 2:
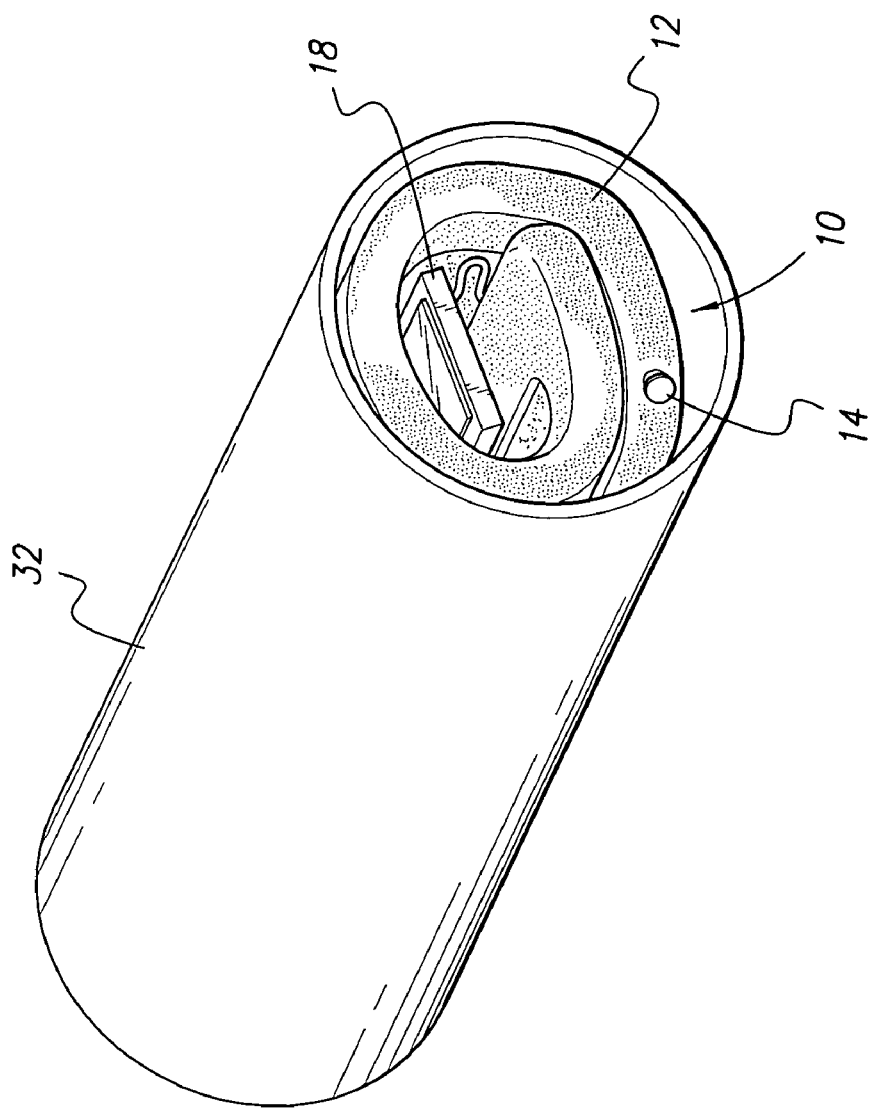
FIG. 2 is a perspective view of the portable airbag scale of FIG. 1, shown deflated, rolled, and placed in a storage container for storage and transport.

By utilizing an inflatable bladder, the scale 10 is easily transportable. As shown in FIG. 1, a handle 16 is preferably secured to an exterior surface of the sidewall 30, allowing the scale 10 to be easily moved. Further, as shown in FIG. 2, a hollow carrying or storage container 32 may be provided, allowing the scale 10 to be transported and stored therein when the inflatable bladder 12 is in the deflated state.

It is to be understood that the present invention is not limited to the embodiments described above, but encompasses any and all embodiments within the scope of the following claims.

I claim:

1. A portable airbag scale, comprising:
   an inflatable bladder having opposed upper and lower walls and at least one sidewall, the lower wall being adapted for positioning on a support surface and the upper wall being adapted for receiving a load to be weighed, the bladder having a port formed through the at least one sidewall for selective inflation and deflation of the inflatable bladder;
   a pressure sensor mounted within the inflatable bladder for measuring air pressure therein;
   means for calculating the weight of the load based upon a difference in air pressure in the inflatable bladder measure when the load is not supported on the upper wall and measured when the load is supported on the upper wall;
   a humidity sensor connected to said means for calculating the weight of the load; and
   means for displaying the calculated weight of the load.

2. The portable airbag scale as recited in claim 1, wherein said pressure sensor comprises a microelectromechanical system pressure sensor.

3. The portable airbag scale as recited in claim 2, further comprising a temperature sensor connected to said means for calculating.

4. The portable airbag scale as recited in claim 3, further comprising means for displaying ambient temperature measured by said temperature sensor.

5. The portable airbag scale as recited in claim 3, wherein the temperature sensor comprises a microelectromechanical system temperature sensor.

6. The portable airbag scale as recited in claim 5, further comprising means for displaying ambient humidity as measured by said humidity sensor.

7. The portable airbag scale as recited in claim 5, wherein the humidity sensor comprises a microelectromechanical system humidity sensor.

8. The portable airbag scale as recited in claim 1, further comprising a carrying container for storage and transport of the inflatable bladder when the inflatable bladder is in a deflated state.

9. A portable airbag scale, comprising:
   an inflatable bladder having opposed upper and lower walls and at least one sidewall, the lower wall being adapted for positioning on a support surface and the upper wall being adapted for receiving a load to be weighed, the bladder having a port formed through the at least one sidewall for selective inflation and deflation of the inflatable bladder;
   a pressure sensor mounted within the inflatable bladder for measuring air pressure therein;
   a temperature sensor for measuring ambient temperature;
   means for calculating the weight of the load based upon a difference in air pressure in the inflatable bladder measured when the load is not supported on the upper wall and when the load is supported on the upper wall, the temperature sensor being connected to the means for calculating;
   a humidity sensor connected to said means for calculating the weight of the load; and
   means for displaying the weight of the load and the ambient temperature.

10. The portable airbag scale as recited in claim 9, wherein said pressure sensor comprises a microelectromechanical system pressure sensor.

11. The portable airbag scale as recited in claim 10, wherein the temperature sensor comprises a microelectromechanical system temperature sensor.

12. The portable airbag scale as recited in claim 9, further comprising means for displaying ambient humidity measured by said humidity sensor.

13. The portable airbag scale as recited in claim 12, wherein said humidity sensor comprises a microelectromechanical system humidity sensor.

14. The portable airbag scale as recited in claim 9, further comprising a carrying container for storage and transport of the inflatable bladder when the inflatable bladder is in a deflated state.

15. A portable airbag scale, comprising:
   an inflatable bladder having opposed upper and lower walls and at least one sidewall, the lower wall being adapted for positioning on a support surface and the upper wall being adapted for receiving a load to be weighed, the bladder having a port formed through the at least one sidewall for selective inflation and deflation of the inflatable bladder;
   a pressure sensor mounted within the inflatable bladder for measuring air pressure therein;
   a humidity sensor for measuring ambient humidity;
   means for calculating the weight of the load based upon a difference in air pressure in the inflatable bladder measured when the load is not supported on the upper wall, and measured when the load is supported on the upper wall, the humidity sensor being connected to the means for calculating; and
   means for displaying the calculated weight of the load and for displaying the ambient humidity measured by the humidity sensor.

16. The portable airbag scale as recited in claim 15, further comprising a temperature sensor connected to the means for calculating.

17. The portable airbag scale as recited in claim 16, further comprising means for displaying ambient temperature measured by said temperature sensor.

18. The portable airbag scale as recited in claim 17, further comprising a carrying container for storage and transport of the inflatable bladder when the inflatable bladder is in a deflated state.

* * * * *